United States Patent

[11] 3,618,616

| [72] | Inventors | William H. Knapp<br>Davenport, Iowa;<br>Ernest M. Van Buskirk, East Moline, Ill. |
|---|---|---|
| [21] | Appl. No. | 996 |
| [22] | Filed | Jan. 6, 1970 |
| [45] | Patented | Nov. 9, 1971 |
| [73] | Assignee | International Harvester Company<br>Chicago, Ill. |

[54] UNIVERSAL ROTOR AND CONCAVE FOR AXIAL FLOW COMBINE
8 Claims, 4 Drawing Figs.

[52] U.S. Cl. .................................................. 130/27 T
[51] Int. Cl. .................................................. A01f 12/26
[50] Field of Search ........................................ 130/27 R, 27 L, 27 T; 56/20, 21

[56] References Cited

UNITED STATES PATENTS

| 2,050,631 | 8/1936 | Schlayer ..................... | 130/27 T |
| 1,334,910 | 3/1920 | Kuntz ......................... | 130/27 L |
| 1,581,835 | 4/1926 | Brown ........................ | 130/27 L |
| 3,470,881 | 10/1969 | Knapp et al. ................. | 130/27 T |
| 3,529,645 | 9/1970 | Murray et al. ................ | 130/27 T |

FOREIGN PATENTS

| 793,982 | 12/1935 | France ........................ | 130/27 T |

*Primary Examiner*—Antonio F. Guida
*Attorney*—Floyd Harman

ABSTRACT: An axial flow combine equipped to operate in various crops and crop conditions without replacing the basic components. Spike-tooth elements are detachably mounted on the threshing cylinder concave and side grates. The rotor has spike teeth along its outer periphery that intermesh with those on the threshing cylinder. When operating in conditions not requiring spike teeth, the detachably mounted spike-tooth elements are removed from the threshing cylinder.

PATENTED NOV 9 1971

INVENTORS
WILLIAM H. KNAPP
ERNEST M. VAN BUSKIRK
BY [signature] ATT'Y.

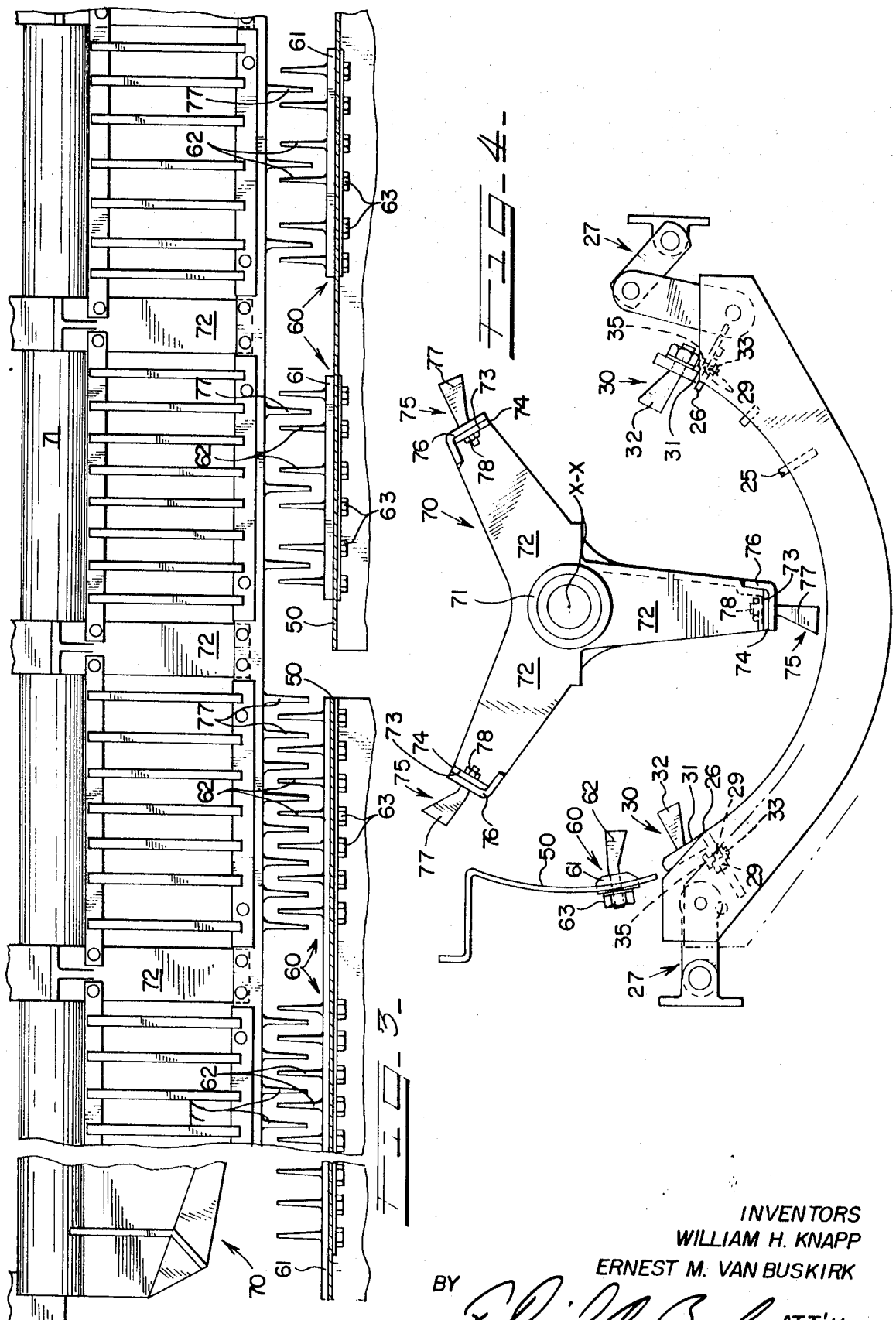

UNIVERSAL ROTOR AND CONCAVE FOR AXIAL FLOW COMBINE

BACKGROUND OF THE INVENTION

1. Field of the Invention

The present invention relates generally to improvements in combines and the like and more particularly to a new and improved axial flow combine that is equipped for operation in various crops and crop conditions without replacing the basic components.

2. Description of the Prior Art

In most commercially available combines the material to be threshed is fed between a rotary cylinder and a stationary concave in a direction normal to the axis of the rotating cylinder. Most of the grain from the material fed to the cylinder and concave passes through the concave as threshed grain. The remainder of the material is conveyed to the separating components of the combine which in conventional combines includes reciprocating or oscillating straw racks and chaffer sieves.

This invention concerns a combine that operates on a completely different principle than the above-described commercially available combine. In the combine described in the subject patent, an elongated rotor is provided along the longitudinal axis of the combine. The elongated rotor is enclosed within a cylinder having transport fins along its internal upper surface and a concave and grates along its lower surface. The material to be threshed is fed into the front end of the cylinder and is fed axially towards the rear as it is being processed by the cooperating elements of the rotor and cylinder. Reference may be made to the copending patents to Knapp et al., U.S. Pat. Nos. 3,534,742 issued on Oct. 20, 1970 and 3,470,881 issued on Oct. 7, 1969; for a more complete disclosure of the operation of an axial flow combine.

SUMMARY

The general purpose of this invention is to provide an axial flow combine which embraces all the advantages of similarly employed axial flow combines and can be adapted to a greater variety of crop and crop conditions. A combine can be used to harvest numerous crops such as wheat, rice, and corn many of which have quite different characteristics. Thus, it is important that a combine be easily adaptable to various working conditions as required by a particular crop or crop condition. To attain this, the present invention contemplates a unique arrangement of spike-toothed elements that can be removably mounted within the threshing cylinder and a rotor having spike teeth along its outer periphery. When a combing or raking of the straw is required such as in weedy conditions, damp straw, or rice harvest the spike-tooth elements are mounted on the threshing cylinder as needed. If it is considered necessary, the wire pattern in the concave is set to provide a desired threshing-separating control. Under conditions where combing or raking is undesirable, such as corn, maise, or dry brittle conditions, the spike-toothed elements are removed and the machine is operated without them. It has been found that when the spike-toothed elements are removed, the rotor, having spike teeth along its outer periphery, performs similar to a rotor having a smooth or rasp bar outer periphery of the type disclosed in the above referred to Knapp et al. U.S. Pat. No. 3,534,742.

An object of the present invention is to render an axial flow combine more versatile and adaptable to various crops and crop conditions.

BRIEF DESCRIPTION OF THE DRAWING

FIG. 3 is a plan view showing the relationship between the rotor and the side grates; and FIG. 4 is an end view showing the relationship between the rotor, a side grate and the concave.

DESCRIPTION OF THE PREFERRED EMBODIMENT

Figure 1:
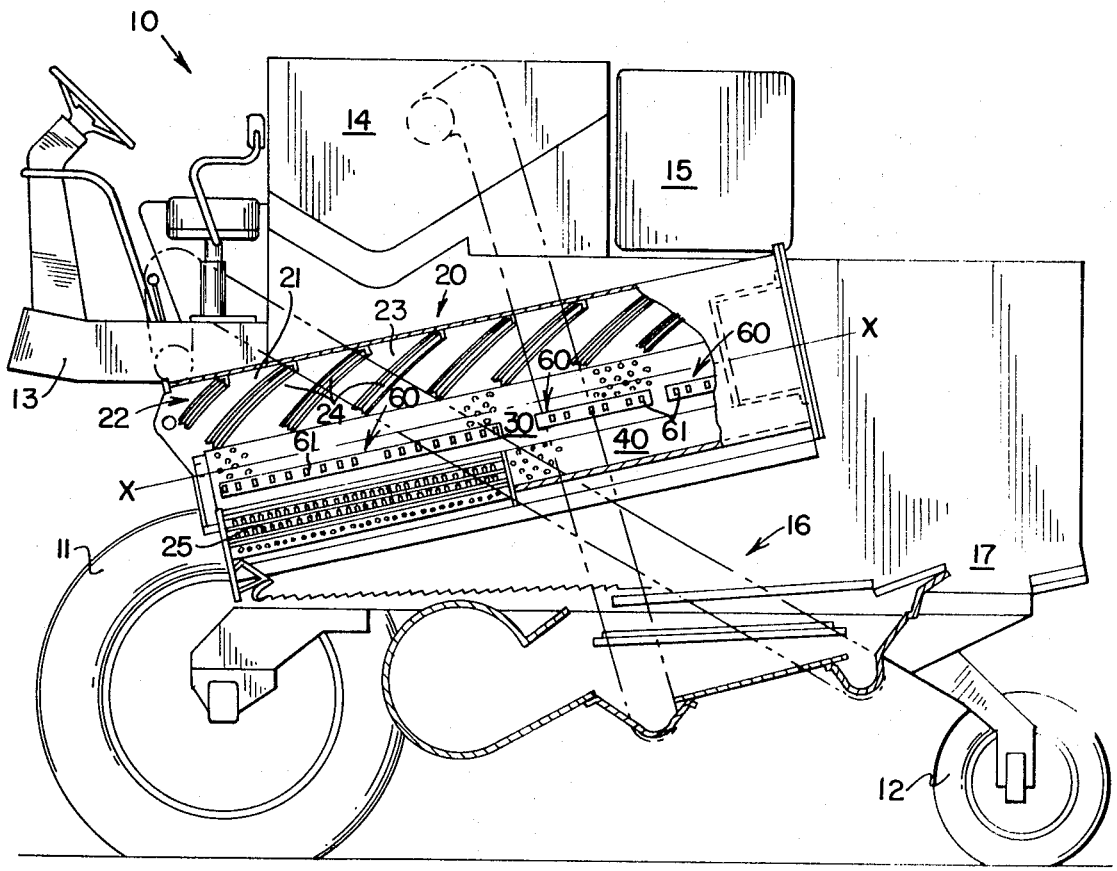
FIG. 1 is a side view of an axial flow combine having a sidewall removed to expose the threshing cylinder which is shown in cross section.

Referring now to the drawings wherein like reference characters designate like or corresponding parts throughout the several views there is shown in FIG. 1 an axial flow combine designated 10 having drive wheels 11, steerable wheels 12, an operator's platform 13, a grain tank 14, an engine 15, and a cleaning system 16. The threshing and separating operation of the combine occurs in the tubular casing designated 20 which lies along an axis X—X. It should be noted that in FIG. 1 the near sidewall of the combine has not been shown so that the tubular casing 20 can be seen. The far sidewall 17 is seen behind the tubular casing 20. A portion of the tubular casing is broken away so that the interior of the casing can be seen.

Figure 2:
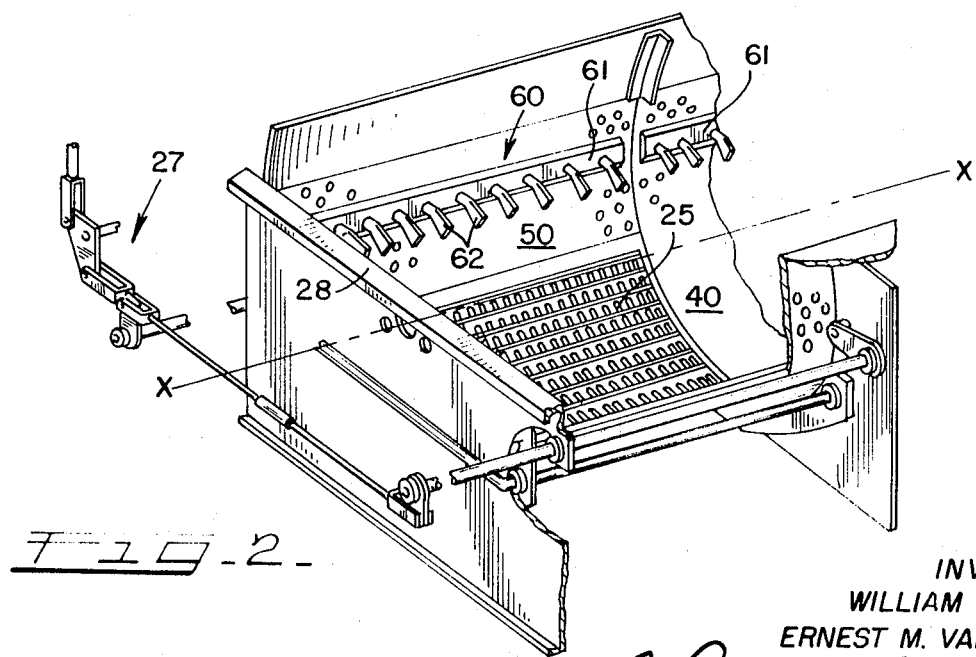
FIG. 2 is an isolated view of the concave portion of the threshing cylinder.

The tubular casing 20 has a forward end 21 having a material entrance opening 22 formed therein. The entrance opening 22 is in the upper portion of the forward end 21. As seen in FIG. 2 the ledge 28 defines the lower boundary of the entrance opening 22. The upper portion 23 of the tubular casing 20 is formed of a grain-impermeable material such as sheet metal. A plurality of transport fins 24 are secured to the upper portion 23 and protrude inwardly therefrom. The transport fins 24 function to index the material rearwardly as it is threshed and separated within the tubular casing. The front lower portion of the tubular casing 20 is formed by a concave 25. As can be best seen in FIG. 4, the concave 25 has axially extending side edges 26. As can be best seen in FIGS. 2 and 4, the concave 25 is mounted on adjustable mounting means 27 such that it can be adjusted in its entirety vertically with respect to the axis X—X. Reference should be made to the above referred to Knapp et al. application Ser. No. 588,191 for a complete disclosure of this adjustable mounting means.

Referring now to FIG. 4 there is shown a pair of first spike-tooth elements identified as 30. A first spike-tooth element 30 is mountable on each of the axially extending side edges 26 of the concave 25. Each of the first spike-tooth elements 30 includes an elongated mounting bar 31, a plurality of spike teeth 32, and means 33 for mounting the element 30 on the axially extending side edges 26 of the concave 25. The means 33 for mounting the element 30 on the side edges 26 includes a plurality of apertures 29 formed in the side edges 26 and nuts and bolts 35 for connecting the element 30 to the side edges through a selected set of the apertures 29. It should be noted that by selecting one set of apertures over another, the position of the element 30 can be adjusted radially with respect to the axis X—X. Furthermore it should be noted that the first spike-tooth elements 30 can be easily removed and inserted depending upon the crop or crop condition. The first spike-tooth elements 30 thus can be adjusted relative to the concave 25 by selecting a different set of apertures 29 or relative to the tubular casing 20 by adjusting the entire concave 25 through the adjustable mounting means 27.

The bottom rear portion of the tubular casing 20 is formed by a grain-permeable grate 40. Side grates 50 grain-permeable material extend the entire length of the tubular casing 20 and are located between the upper portion 23 and the lower concave 25 grate 40.

Second spike-tooth elements 60 are mounted on the side grates 50 and can extend the entire length of the tubular casing 20. The second spike-tooth elements are made up of elongated mounting bars 61, a plurality of spike teeth 62 and means 63 for securing the mounting bar 61 to the internal surface of the side grates 50. It should be noted that the second spike-tooth elements 60 are seen in all figures whereas the first spike-tooth elements 30 are seen only in FIG. 4. As can be best seen in FIG. 3 the number of spike teeth 62 on a particular spike-tooth element 60 can be varied. In the drawings there is shown a full complement of spike teeth in the front sections and a sparce complement in the rear sections. Of course, a full complement all the way or any other pattern is possible through the choice of spike-teeth-mounting holes. This is true for both the elements 60 and the spike teeth 77 in the mounting bars 76.

The elongated rotor 70 is mounted for rotation within the tubular casing 20 and extends the entire length of the tubular casing. The elongated rotor 70 is made up of a tubular core 71 and a plurality of longitudinally extending blades that radiate from the core 71. In FIG. 4 it can be seen that the rotor illustrated herein has three blades radiating from the core. Each of the blades is made up of a plurality of outwardly extending arms 72 that terminate in outer ends 73. The group of outwardly extending arms 72 making up a blade lie in a plane passing through the core 71. Longitudinally extending members 74 are secured to the outer ends 73 of each group of arms 72 making up a blade. Rotating spike-tooth elements 75 are secured to the longitudinally extending members 74 such that they protrude radially of the elongated rotor 70. The rotating spike-tooth elements 75 include elongated mounting bars 76 having a plurality of spike teeth 77 extending therefrom. Mounting means such as nuts and bolts 78 connect the rotating spike-tooth elements 75 to the longitudinally extending members 74. For a more complete disclosure of the elongated rotor reference should be made to the above referred to Knapp et al. U.S. Pat. No. 3,534,742.

It should be understood, of course that the foregoing disclosure relates to only a preferred embodiment of the invention and that numerous modifications or alterations may be made therein.

What is claimed is:

1. In an axial flow combine having a tubular casing formed about an axis,
   said tubular casing having:
   a forward end through which unthreshed material is transport fins protruding from the upper internal surface of said tubular casing,
   the forward bottom portion of said tubular casing formed by a concave, said concave including axially extending side edges, means mounting said concave for vertical adjustment with respect to said axis, first spike-tooth elements comprising elongated mounting bars and a plurality of spike teeth secured thereto, means for removably mounting said first spike-tooth elements on said axially extending side edges,
   the rear bottom portion of said tubular casing formed of a grain-permeable grate,
   the sides of said tubular casing formed of side grates of grain permeable material and located between said upper and bottom portions, second spike-tooth elements comprising elongated mounting bars, and a plurality of spike teeth secured thereto, means for removably mounting said second spike-tooth elements on said side grates such that the spike teeth extend axially inwardly with respect to said axis;
   an elongated rotor mounted for rotation within said tubular casing about said axis, said rotor including
   a core,
   a plurality of outwardly extending arms, said arms terminating in outer ends, groups of said outwardly extending arms lying in respective planes passing through said core,
   longitudinally extending members respectively associated with each of said groups and secured to the outer ends of the arms of its associated group, rotating spike teeth secured to said longitudinally extending members and located such that they intermesh with the spike teeth of said first and second spike-tooth elements.

2. The invention as set forth in claim 1 wherein said concave is mounted on said combine by means permitting vertical adjustment of the entire concave relative to the axis.

3. The invention as set forth in claim 1 wherein said means for removably mounting said first spike-tooth elements on said axially extending side edges permits adjustment of said first spike-tooth elements relative to said concave.

4. The invention as set forth in claim 1 wherein said means for removably mounting said second spike-tooth element extends the entire length of said side grates.

5. The invention as set forth in claim 2 wherein said means for removably mounting said first spike-tooth elements on said axially extending side edges permits adjustment of said first spike-tooth elements relative to said combine.

6. The invention as set forth in claim 5 wherein said means for mounting said second spike-tooth element extends the entire length of said side grates.

7. The invention as set forth in claim 2 wherein said means for mounting said second spike-tooth element extends the entire length of said side grates.

8. The invention as set forth in claim 3 wherein said means for mounting said second spike-tooth element extends the entire length of said side grates.

* * * * *